United States Patent
Hu et al.

(10) Patent No.: US 7,616,953 B2
(45) Date of Patent: Nov. 10, 2009

(54) SYSTEM AND A METHOD OF REALIZING SUBSCRIBER'S FOREIGN ROAMING SERVICE THROUGH THE ROUTER

(75) Inventors: Xianli Hu, Shenzhen (CN); Haipeng Li, Shenzhen (CN)

(73) Assignee: ZTE Corporation, Guangdong (CN)

( * ) Notice: Subject to any disclaimer, the term of this patent is extended or adjusted under 35 U.S.C. 154(b) by 722 days.

(21) Appl. No.: 10/585,537

(22) PCT Filed: Jun. 22, 2004

(86) PCT No.: PCT/CN2004/000667

§ 371 (c)(1),
(2), (4) Date: Jul. 10, 2006

(87) PCT Pub. No.: WO2005/071994

PCT Pub. Date: Aug. 4, 2005

(65) Prior Publication Data

US 2009/0005035 A1    Jan. 1, 2009

(30) Foreign Application Priority Data

Jan. 13, 2004    (CN)    .................. 2004 1 0000272

(51) Int. Cl.
*H04W 4/00* (2009.01)
*H04W 36/00* (2009.01)
*H04L 12/16* (2006.01)
*H04L 12/28* (2006.01)

(52) U.S. Cl. .................. 455/432.1; 455/435.1; 370/331

(58) Field of Classification Search .............. 455/432.1, 455/432.3, 433, 435.1–435.3, 436; 370/250, 370/254, 255, 400, 409, 328, 331

See application file for complete search history.

(56) References Cited

U.S. PATENT DOCUMENTS

| 5,930,714 | A | 7/1999 | Abu-Amara et al. ........ 455/442 |
| 7,072,653 | B1 * | 7/2006 | Sladek et al. ............ 455/432.3 |
| 2003/0233332 | A1 * | 12/2003 | Keeler et al. .................. 705/64 |

FOREIGN PATENT DOCUMENTS

| CN | 1319317 A | 10/2004 |
| WO | WO 00/59252 | 10/2000 |

* cited by examiner

*Primary Examiner*—Patrick N Edouard
*Assistant Examiner*—Michael T Thier
(74) *Attorney, Agent, or Firm*—Thomas, Kayden, Horstemeyer & Risley, LLP

(57) ABSTRACT

A system and method of realizing subscriber's roaming service through the route server, employed in next generation network system which realizes cross-domain calling route through the route server, wherein when the roaming device is accessed, the register server judges whether the roaming device is a contracted subscriber or a roaming subscriber, then performs authentication, and notifies the soft switch control device to perform register operation and report location update message, for the contracted describer, the register server further needs to notify the roaming region that the subscriber has returned, and initiates location update in the roaming region, for the roaming subscriber, the register server sends register message to the home region to obtain the subscriber's service information and the location information of the contracted area, the register server of the home region registers the location information of the roaming area and reports the location update message, for the roaming subscriber-related service, the soft switch control device can accomplish connection and control according to normal procedure. The system and method of the present invention can realize subscriber's roaming service.

21 Claims, 5 Drawing Sheets

SYSTEM AND A METHOD OF REALIZING SUBSCRIBER'S FOREIGN ROAMING SERVICE THROUGH THE ROUTER

CROSS-REFERENCE TO RELATED APPLICATIONS

This application is a national stage application of International Application No. PCT/CN2004/000667, filed Jun. 22, 2004, which claims priority to Chinese Patent Application No. 200410000272.8, filed Jan. 13, 2004, both applications of which are hereby incorporated by reference in its entirety into the present application.

TECHNICAL FIELDS

The present invention relates to broadband telecommunication network, particularly relates to a system and method for realizing roaming service under this network architecture.

TECHNICAL BACKGROUND

The telecommunication system mainly includes wired telecommunication system and wireless telecommunication system. The subscriber equipment in the wired telecommunication systems is commonly identified with physical lines such as cables, and they are corresponding to each other; if the subscriber moves from one place to another, it needs the network operator to provide machine-moving service, and the subscriber can't enjoying service anytime and anywhere. While in the wireless network, because wireless access is free from the harassment of physical line, the wireless telecommunication system such as GSM, CDMA can provide roaming service inherently by using equipments such as VLR/HLR.

It is necessary to provide telecommunication service anytime and anywhere due to the increasing demand of communication, but if each time the subscriber moves to a new place, he has to use a new telephone number to access, the subscriber has to inform all of his relatives and friends of the new telephone number one by one, otherwise, if one wants to contact him, he obviously needs to get the new telephone number first. In contrast, the advantage brought by roaming service is self-evident: the subscriber can enjoy telecommunication service anywhere and anytime while only using one telephone number.

Currently, the next generation network architecture with soft switch as core control equipment still hasn't provided roaming function, but due to the inter-connectivity of broadband network, if the current location information of the subscriber can be located, it is possible for the subscriber in the next generation network architecture with soft switch as core control equipment to be able to enjoy roaming service.

In order to realize roaming, it needs to locate the position of the soft switch control device the subscriber currently located in. In the present invention, it is realized by the route server. As a network equipment, the route server is a device for providing route service, and providing interface for inquiring and modifying terminal location information.

China patent application No. 200310112905.X discloses a method and system for realizing call route by employing the route server (i.e. the route serving device in this article), in which the soft switch control device and the route server are networked in a layered manner, and the route server accomplishes the call route; when the subscriber route changes, the soft switch control device reports location update message, the subscriber route information is maintained through the steps of reporting and registering; when cross-domain calling, the calling soft switch equipment obtains the route of the soft switch control device the called located in, such as IP address, by initiating an inquiry request toward the route server; the subscriber in a certain domain can obtain location information, such as the domain anyone of the subscribers in the whole network located in, by accessing the route server.

It is an important problem waiting to be solved that how to realize subscriber's roaming service by employing the route function of the next generation network.

SUMMARY OF THE INVENTION

The technical problem to be solved in this invention is how to realize subscriber's roaming service by employing the route function of the next generation network, and to provide a method and system for realizing subscriber's roaming service by route server in the next generation network architecture which takes soft switch as core control equipment.

In order to solve the above technical problem, the present invention provides a method for realizing subscriber's roaming service by route server, employed in the next generation network architecture which realizes cross-domain call route by route server, including the following steps of:

(a) the subscriber equipment accessing to network, finding the local register server, sending a register request and reporting subscriber identification and authentication information;

(b) the local register server judging whether the subscriber is a contracted subscriber of local domain, if yes, performing step (c), otherwise, performing step (g);

(c) the local register server judging whether the authentication information is right, if not, refusing register, otherwise, performing the next step;

(d) the local register server notifying the local soft switch control device to perform register operation;

(e) the local register server judging whether there is roaming register information of the subscriber existing, if no, registering the subscriber and reporting the location update message to the route server and ending the registration; otherwise, notifying the register server of the roaming region that the subscriber has returned, and reporting the location update message of the subscriber to the route server, and performing the next step;

(f) the register server of roaming region logouting the register information of this roaming subscriber, and reporting the location update message of the roaming subscriber to the route server via the soft switch control device, and ending the registration;

(g) the register server of roaming region finding the register server of home region by inquiring the router server, and judging whether the authentication information is right in messages exchange between the register server of roaming region and the register server of home region, if not, refusing and ending the registration; otherwise, obtaining the service information of the roaming subscriber, and performing the next step;

(h) the register server of roaming region notifying the soft switch control device to perform register operation, allocate resource for the roaming subscriber, store the location information of home region and the service information of the roaming subscriber, and to send the register message including the location information of roaming region to the register server of home region;

(i) the register server of home region notifying the soft switch control device of home region to register the registration, and reporting the location update message of the roaming subscriber to the route server, and notifying the register result to the register server of roaming region;

(j) the register server of roaming region notifying the soft switch control device of roaming region to report the location update message of the roaming subscriber to the route server, and ending the registration; and (k) the soft switch control device of roaming region performing connection and service control on the roaming subscriber-related services initiated in roaming region and non-roaming region according to local service and inter-office service respectively.

Further, in step (a), the protocol between the roaming equipment and the register server can be expanded on the basis of the existing protocol supported by terminal equipments (such as H248, MGIP, SIP), if only it conforms to the register process described in the present invention, the physical lines can employ various kinds of access forms, such as IP network, WLAN, to which the present invention doesn't set limitation.

Further, in step (a), when the access point of roaming equipment has no fixed IP address, the register server connected by the roaming equipment needs to allocate an IP address for the roaming equipment.

Further, in step (a), the roaming equipment needs to look for the register server of home domain, if the roaming equipment supports DHCP protocol, the register server can operate as HCHP server, and the roaming equipment can locate the register server of home domain according to the location DHCP server mechanism in DHCP protocol, otherwise, it is necessary to look for the register server by the way of presetting address.

Further, in step (a), the subscriber identification refers to telephone number which can locate the subscriber uniquely, or the uniform resource identification (URI); the report information can be carried and reported by the roaming equipment automatically, or can be input by the roaming subscriber exchanging with the register server through the roaming equipment.

Further, in step (a), the roaming equipment also reports signaling protocol it supports, correspondingly, in step (c) and (g), the register server further needs to judge whether it supports the signaling form of the roaming equipment or not, if not, it refuses the registration.

In step (d) and (h), if the operation fails, the registration of the roaming equipment will be refused, and an error message will be sent to the roaming equipment.

Further, in step (k), after the soft switch control device of roaming region finishing service, it is capable of sending the charge information of the roaming subscriber to the soft switch control device of home region according to the balance relationship between soft switch control devices, and between operators. The charge information includes the service category, starting time and ending time etc. of the current service.

Further, in step (j), if the soft switch control device of roaming region does not receive the register response message of the soft switch control device of home region, whether to access the roaming equipment or not is determined according to policy. If access, the policy can be set as: whether and how to re-transmit the message of registering with the soft switch control device of home region; and how to send the service charge information generated to the soft switch control device of home region before re-transmitting successfully, etc.

Further, when the roaming equipment roams from one roaming region to another, in said step (g), the register server of roaming region first finds the register server of the original roaming region according to the route server, and obtains the location information of home region stored in it, then finds the local register server; at the same time, in said step (h), the register server of roaming region further notifies the register server of the original roaming region that the subscriber has registered in the new roaming region it is in, and the register server of the original roaming region notifies the soft switch control device to logout the register information of the roaming subscriber, and reports the location update message of the roaming subscriber to the route server.

Further, in step (g), it is sometimes necessary to obtain other attribute information supported by the soft switch control device of home region, such as the inter-office protocol, at the same time, in step (h), the soft switch control device of roaming region stores the attribute information, and includes its own attribute information into the register information sent to the home region.

Further, when the roaming equipment is off-line, it can be reported to the current register server voluntarily, or the current soft switch control device detects whether the roaming equipment is off-line, after the register server has received the off-line notification from the roaming equipment or the soft switch control device, it sets the roaming equipment in the state of off-line.

Further, in step (k), the roaming subscriber-related service has no difference with the ordinary subscriber in terms of outside (signaling), except that when the soft switch control device judges that the calling or the called is in roaming state according to the IP address of the calling or the subscriber identification of the called, the call connection and service control are performed by the soft switch control device of its current location according to the local location information and service information.

Further, in step (k), if there is register information in home region registered by the roaming equipment in the roaming region, when the subscriber of home region calls the roaming equipment, the call can be also routed to the soft switch control device of roaming region directly.

Further, after the roaming equipment is in off-line state in the roaming region, it is possible to decide whether the logout message should be notified to the local register server according to policy.

Further, the operations of the route information report, check-in and inquiry of the present invention can employ the method disclosed in China patent application No. 200310112905.X, but not limited to it; it is also possible to employ other methods and systems for realizing call route.

The system provided in the present invention for realizing the above method, employed in the next generation network architecture with soft switch as core control equipment, comprises:

two or more soft switch control devices located in different physical locations, for accomplishing call connection and service control;

at least one route server, for connecting the soft switch control devices domain into one network, and realizing the functions of the subscriber route check-in, report and inquiry;

with characterized in further comprising:

a roaming equipment, for the roaming subscriber accessing the network;

a register server, for using coordinately with the soft switch control device;

with said equipments connected with each other by network, in which:

said roaming equipment is used for accessing the network, registering with the register server mutually, reporting the subscriber identification, authentication information, and performing the ordinary function of receiving and answering call;

said register server comprises:

an address allocation unit, for allocating IP address to the roaming equipment;

an authentication unit, for authenticating the roaming equipment;

a register communication unit, for sending register message containing location information, service information of roaming subscriber and the register notification of subscriber to other register server, and receiving the register message, the service information of roaming subscriber and the register notification of subscriber from other register server;

a register control unit, for judging whether the accessed roaming equipment is contracted subscriber of home domain, sending a control instruction to the authentication unit and the register communication unit according to preset procedure, and notifying the soft switch control device to perform operations of register, check-in and reporting the location update message; and an information maintenance unit, for maintaining the local information of the roaming equipment, notifying the soft switch control device to logout the information of corresponding roaming subscriber after receiving the register notification from other register server, for example, setting its state to be invalidation;

said soft switch control device comprises:

a register operation unit, for allocating resource for the roaming subscriber according to the notification of the register control unit, and as roaming region storing the service information of the roaming subscriber and the location information of the contacted region;

a check-in operation unit, for checking in the information of the register message transmitted from the check-in roaming region according to the notification of the register control unit; and an update report unit, for reporting the location update message to the route server connected.

The local information of the above roaming equipment at least includes the subscriber identification of the roaming equipment, the subscriber category (contracted subscriber or roaming subscriber), subscriber state (in home region, roaming, on-line, off-line, etc) and the location information of the home region; it can also include the location information of the roaming region, the service information and the inter-office protocol supported by the opposite soft switch control device, etc.

It is necessary to point out particularly that, the register server of the present invention refers to the logic component possessing the above functions; in terms of entity, it can be either a composing part of the soft switch control device, or an independent equipment; or part of the functions are finished by the independent equipment, while other part of the functions are finished by the composing part of the soft switch control device.

Further, in the above system, the roaming equipment supports DHCP protocol, and the register server can operate as DHCP server.

Further, in the above system, the roaming equipment carries subscriber identification (telephone number or uniform resource identification), authentication information and supported protocol information by itself, for example stored in IC card. Said register control unit further needs to judge whether it supports the signaling form of the roaming equipment.

Further, in the above system, the soft switch control device further includes a charge process unit, which sends the charge information of the roaming subscriber to the soft switch control device in home region after finishing the service, according to the balance relationship between the soft switch control devices, and between operators.

Further, in the above system, the soft switch control device further includes an off-line detecting unit, for detecting whether the roaming equipment is off-line automatically, if the roaming equipment is detected to be off-line, notifying the information maintenance unit to set the roaming equipment in the state of off-line.

Further, in the above system, the roaming equipment can also report the message of oncoming off-line state to the current register server voluntarily.

According to the above system and method, the present invention makes it always possible for the roaming equipment to find its home region when registering, register the location information of the roaming region where it located in home region, and enables the route server always store the address information of the soft switch control device of the location in which the roaming equipment located and at the same time store the service information of the roaming subscriber in the roaming region through reporting location update message in the home region and the roaming region, therefore realizing roaming service. The advantage of roaming is self-evident. The subscriber can enjoy telecommunication service anytime and anywhere only by one telephone number. When a subscriber roams to a region, he can enjoy all the services of original home region just by making its terminal equipment access to the local system.

PREFERRED EMBODIMENTS OF THE INVENTION

The location update message in this article at least includes the subscriber identification of roaming equipment and the address information of the soft switch control device in which the roaming equipment currently located, such as IP address, etc. The address information of the home region and the roaming region in this article at least includes the address information of the local soft switch control device, and can also include the address information of the local register server; The soft switch control device allocating resource to the roaming subscriber means to allocate corresponding process ability to the roaming equipment, such as the allocation of process unit, the allocation of data space, and data configuration for accomplishing related service, etc.

There are three kinds of forms for subscriber roaming: the subscriber roaming from the home region to the roaming region, the subscriber returning from the roaming region to the home region, and the subscriber moving from one roaming region to another roaming region. Next, the registration of the roaming equipment with the three kinds of forms for subscriber roaming will be described according to three embodiments. In the following description, S refers to the soft switch control device, G refers to the register server, D refers to the roaming equipment and R refers to the route service device.

Embodiment One

Figure 1:
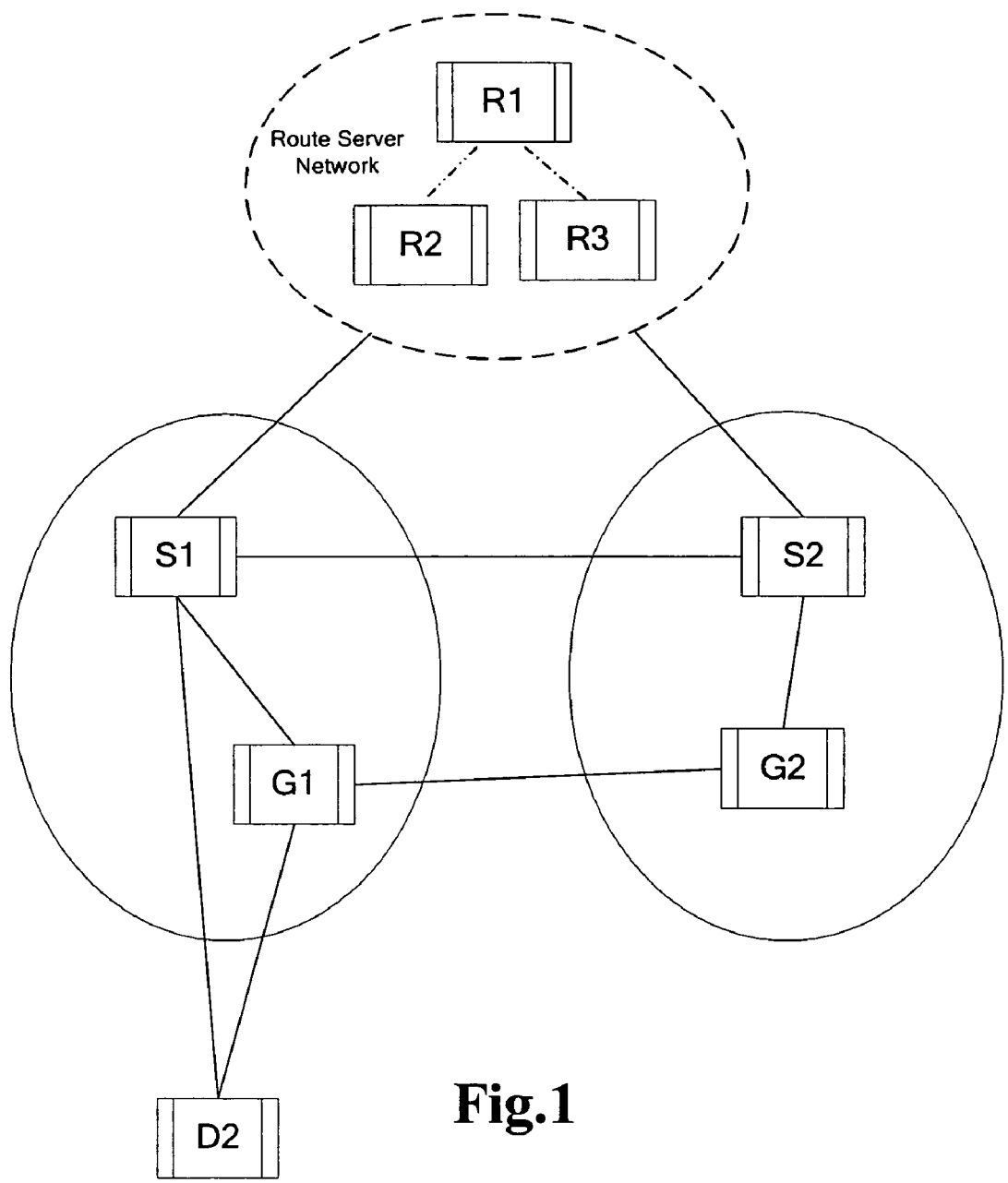
FIG. 1 is the schematic view for realizing roaming service when the subscriber roams from home region to roaming region according to the embodiments of the present invention.

The system of this embodiment is shown as FIG. 1, in which, the networking of the route service device only represents one route service device network, the detailed network topology structures are different according to specific embodiments, the present invention does not concern how to network route service device, it only requires all the soft switch control devices in roaming area adding into the route service device network.

Figure 1A:
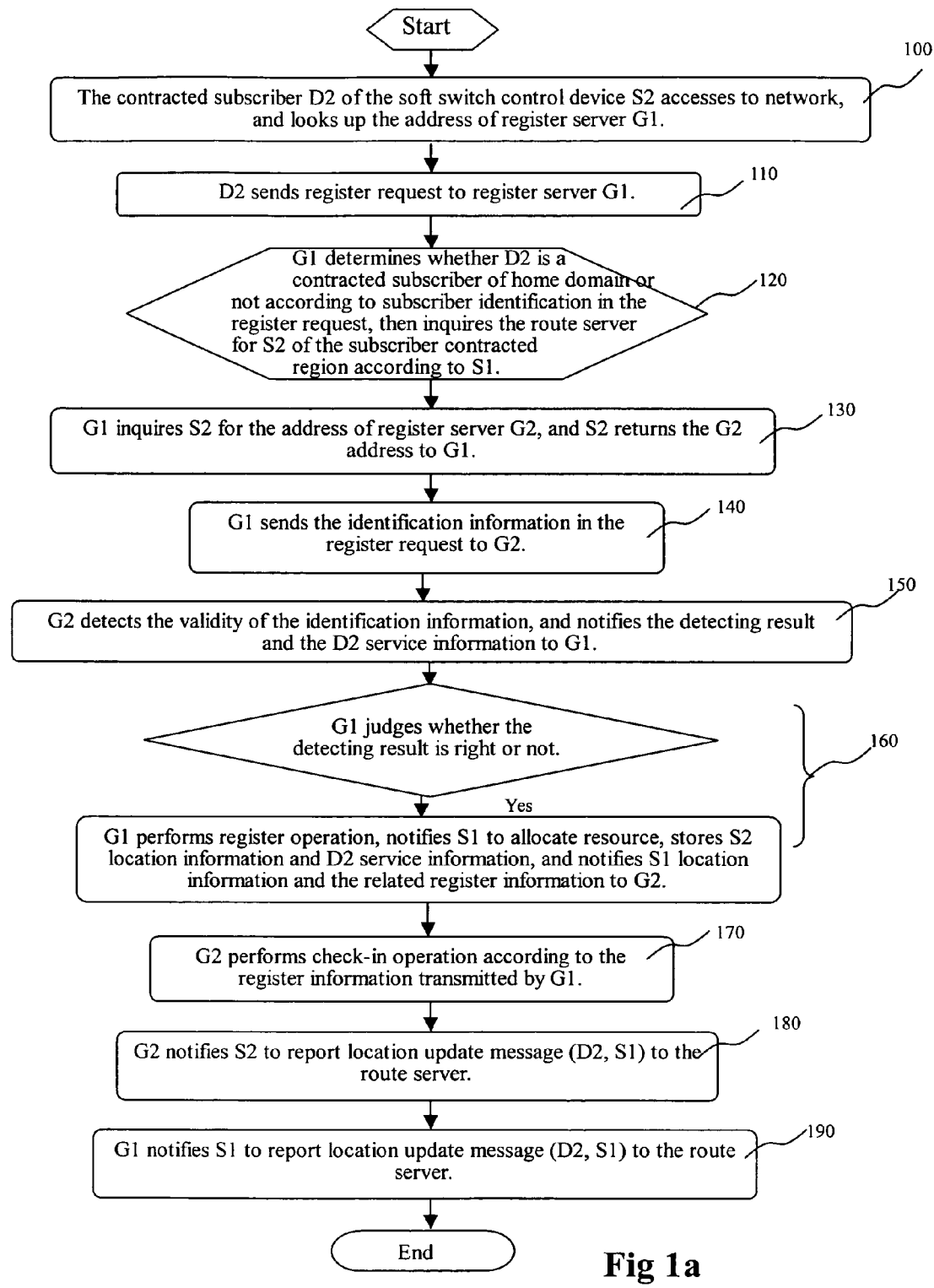
FIG. 1a is the flowchart of registering for the subscriber of FIG. 1 roaming from home region to roaming region.

In FIG. 1 and FIG. 1a, D2 is the contracted subscriber of the soft switch control device S2, when D2 roams from S2 domain to S1 domain, it needs to register with S1, the whole register process includes the following steps of:

D2 accessing the network, and looking up the address of register server G1, step 100; then D2 sending register request to register server G1, step 110;

G1 determining that D2 is not the contracted subscriber of local domain according to the subscriber identification in the register request, first looking up S2 of the subscriber home region in route server according to S1, step 120;

G1 inquiring S2 for the address of register server G2, and S2 returning the address of G2 to G1, step 130;

G1 sending the identification information in the register request to G2, step 140;

G2 detecting the validity of the identification information, and notifying the detection result and the service information of D2 to G1, step 150;

If the detecting result is legal, G1 performing register operation, notifying S1 to allocate resource, storing the location information of S1 and service information of D2, and notifying the location information of S1 and the related register information to G2, step 160;

G2 performing check-in operation according to the register information transmitted by G1, step 170;

G2 notifying S2 to report location update message (D2, S1) to the route server, step 180; and G1 notifying S1 to report location update message (D2, S1) to the route server, step 190.

In the above step 160, G1 can further store the address information of G2, and include the address of G1 into the register information to send it to G2 for checking in, so as to locate the opposite register server directly.

Embodiment Two

Figure 1B:
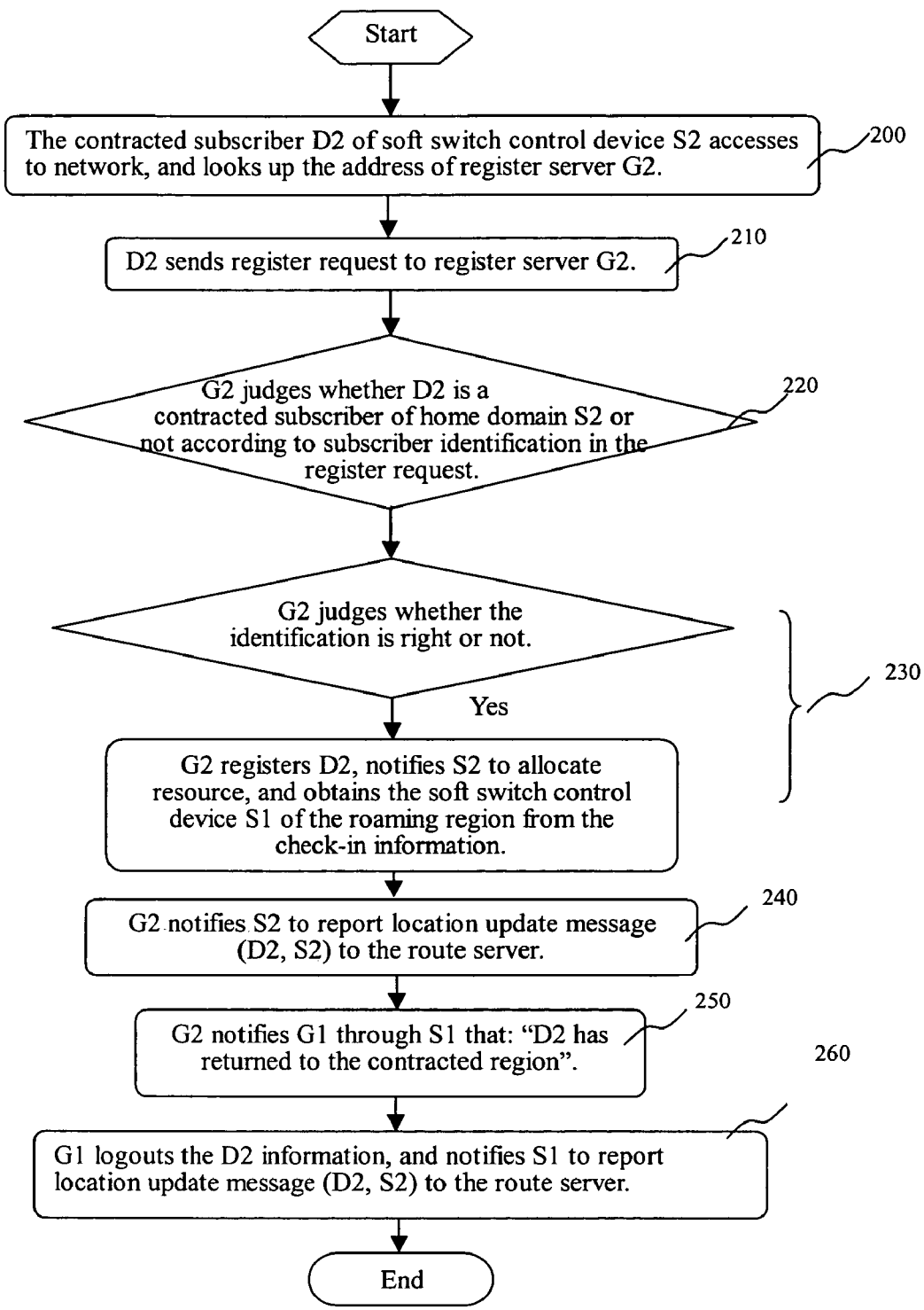
FIG. 1b is the flowchart of registering for the subscriber of FIG. 1 returning from roaming region to home region.

In FIG. 1 and FIG. 1b, when D2 returns from S1 domain of roaming region to S2 domain of home region, it needs to re-register with S2, the register process includes the following steps of:

D2 accessing to network, and looking up the address of register server G2, step 200;

D2 sending register request to register server G2, step 210;

G2 determining that D2 is contracted subscriber of S2 in local domain according to the subscriber identification in the register request, step 220;

G2 detecting the validity of identification, if the result is legal, registering D2, notifying S2 to allocate resource, and obtaining the soft switch control device S1 of the roaming region according to the check-in message, step 230;

G2 notifying S2 to report location update information (D2, S2) to the route server, step 240;

G2 notifying G1 through S1 that: 'D2 has returned to home region', step 250; and G1 logouting information of D2, and notifying S1 to report location update information (D2, S2) to the route server, step 260.

Embodiment Three

Figure 2:
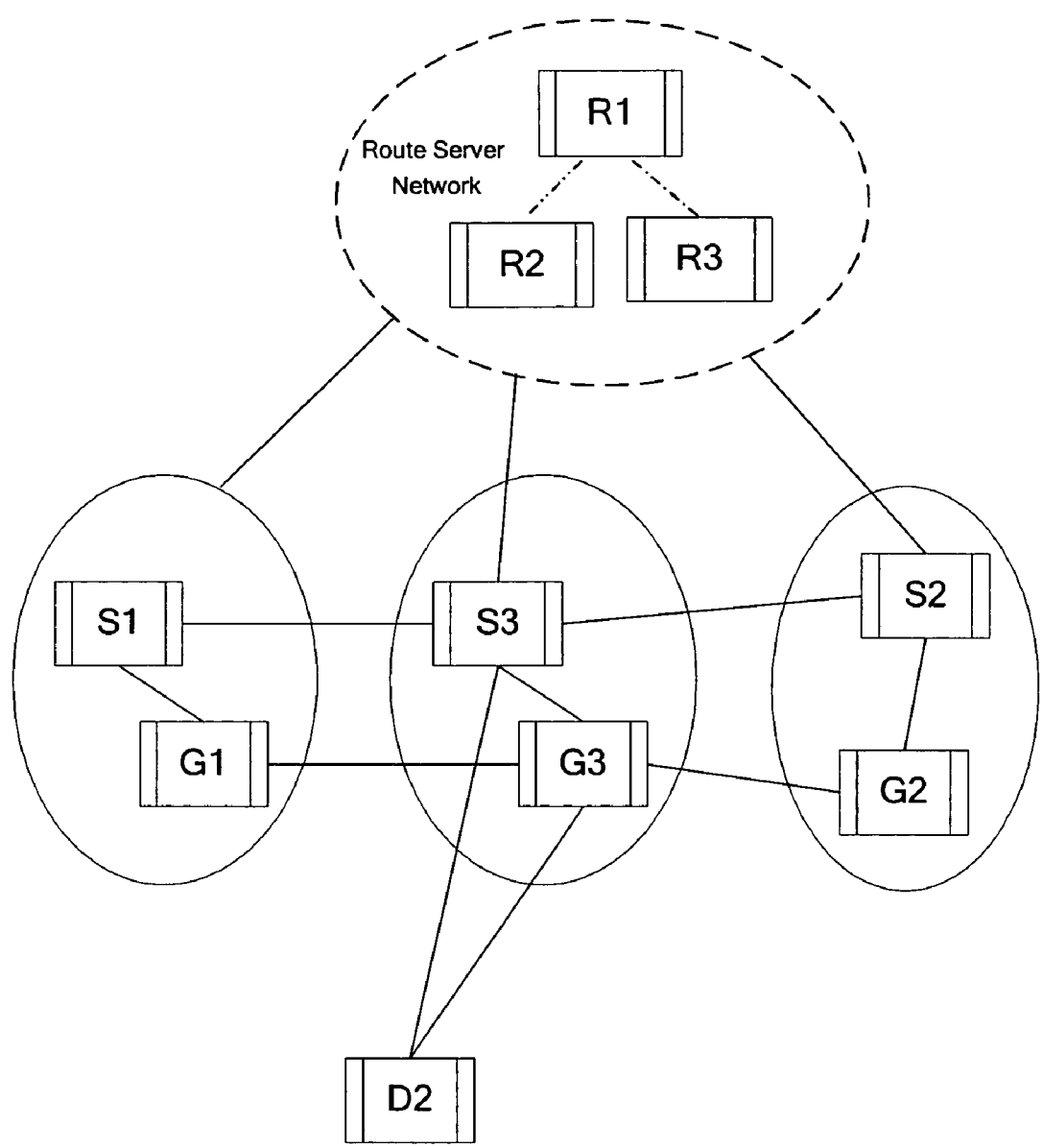
FIG. 2 is the schematic view for realizing roaming service when the subscriber moves from one roaming region to another according to the embodiments of the present invention.
Figure 2A:
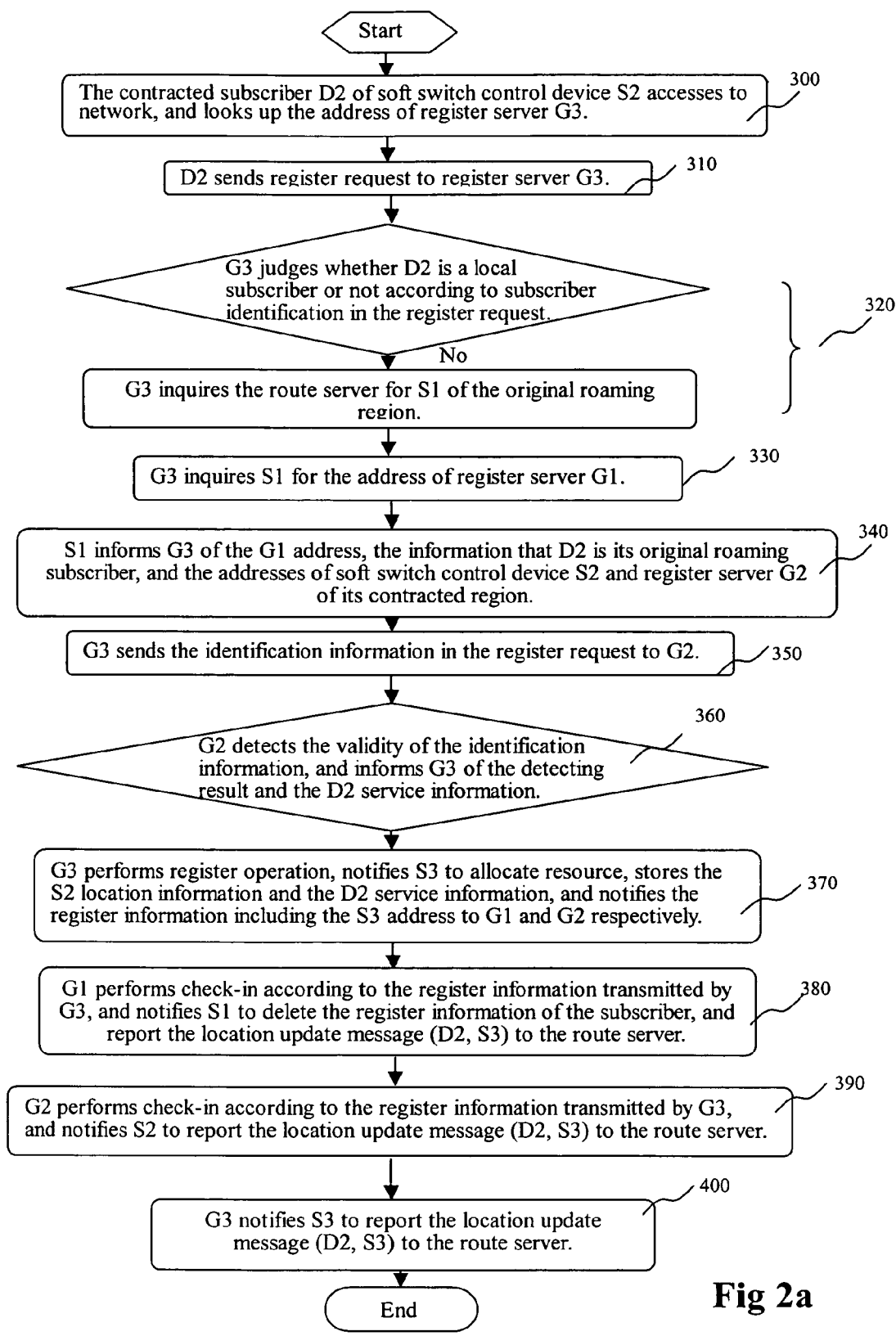
FIG. 2a is the flowchart of registering for the subscriber of FIG. 2 moving from one roaming region to another.

In FIG. 2 and FIG. 2a, D2 roams from S1 domain of roaming region to S3 domain of another roaming region, D2 needs to re-register with S3; supposing that in this embodiment, G1 includes the address information of G2, this register process includes the following steps of:

D2 accessing the network, and looking up the address of register server G3, step 300;

D2 sending register request to register server G3, step 310;

G3 determining that D2 is not local subscriber according to the subscriber identification in the register request, and first looking up S1 of the original roaming region of the subscriber in the route server, step 320;

G3 inquiring S1 for the address of its register server G1, step 330;

S1 informing G3 of the address of G1, the information that D2 is its original roaming subscriber and the address of soft switch control device S2 and register server G2 in its home region, step 340;

G3 sending the identification information in the register request to G2, step 350;

G2 detecting the validity of the identification information, and informing G3 of the detecting result and the service information of D2, step 360;

If the detecting result is legal, G3 performing register operation, notifying S3 to allocate resource, storing the location information of S2 and the service information of D2, and notifying the register message including the address of S3 to G1 and G2 respectively, step 370;

G1 performing register according to the register message transmitted from G3, notifying S1 to delete the register information of the subscriber, and reporting the location update information (D2, S3) to the route server, step 480;

G2 performing check-in according to the register message transmitted from G3, and notifying S2 to report the update location information (D2, S3) to the route server, step 490; and G3 notifying S3 to report location update information (D2, S3) to the route server, step 500.

Once the roaming equipment finishes the registration, it can proceed with services. All the services related to roaming subscriber can be located to the soft switch control device of roaming region depending on the route server. If the service is initiated in the roaming region, the soft switch control device of roaming region will consider the service as a local service, and perform connection; if the service is initiated in non-roaming region, the soft switch control device of roaming region will consider the service as an inter-office service, and perform connection. Then, the soft switch control device of roaming region decides whether to send the charge information of all the roaming equipment to the soft switch control device of home region according to policy. Next, by taking the situation of D2 of FIG. 1 roaming to S1 domain as an example, the call service flowchart of these situations will be analyzed briefly as following:

Service Initiated in Roaming Region

Subscriber in S1 domain calls D2. S1 inquires the route server or local database to obtain its local location information according to the called information such as the called telephone number or uniform resource indicator (URI) etc, then performs call connection and service control according to the local location information and service information. S2 can send the charge information to its home S2 according to the information of D2 in the local database records.

D2 calls the subscriber in S1 domain. Its call flowchart is same to the service flowchart for one subscriber within domain calling another subscriber within domain except that at the calling terminal, S1 determines that the calling subscriber is roaming subscriber according to the information such as IP address of the calling, therefore, performs call connection and service control according to its local location information and service information. S1 can send the charge information to S2 of its home region according to the information of D2 in the local database records.

Service Initiated in Non-Roaming Region

Subscriber in S2 domain calls D2. S2 inquires the local database to obtain the information that it is in roaming state according to the called telephone or uniform resource indicator, therefore, obtains its roaming location information by inquiring the route server or the local database, and then performs inter-domain call connection and service control according to its roaming location information and local service information.

D2 calls the subscriber in S2 domain. Its call flowchart is same to the service flowchart for a subscriber within domain calling a subscriber outside domain except that, at the calling terminal, S1 determines that the calling is a roaming subscriber according to the information such as IP address of the calling, therefore, performs call connection and service control according to its local location information and service information.

Subscriber in other soft switch control devices calls D2. Its call flowchart is same to the service flowchart for a subscriber within domain calling a subscriber outside domain except that, at the called terminal, S1 determines that the called is a roaming subscriber according to the called information such as the called telephone or uniform resource indicator, therefore, performs call connection and service control according to its local location information and service information. S1 can send the charge information to its home S2 according to the information of D2 in the local database records.

The roaming subscriber calls subscriber in other S domains. Its call flowchart is same to the service flowchart for a subscriber within domain calling a subscriber outside domain, except that S1 determines that the calling subscriber is a roaming subscriber according to the information such as IP address of the calling, therefore performs call connection and service control according to its local location information and service information. S1 can send the charge information to its home S2 according to the information of the roaming subscriber in the local database records.

INDUSTRIAL APPLICABILITY

The present invention realizes the roaming service of mobile subscriber by fully utilizing the route function of the next generation telecommunication network, which makes it always possible for the roaming mobile terminal (such as a mobile telephone) to find its home region when registering, and register the location information of the roaming region in its home region, and through reporting location update message in the home region and the roaming region, the route server is always able to store the address information of the soft switch control device of the location where the mobile telephone currently located and at the same time store the service information of the mobile telephone subscriber in the roaming region, therefore realizing roaming service. The advantage of mobile telephone roaming is self-evident, the mobile telephone subscriber can enjoy telecommunication service anytime and anywhere while only using one telephone number. When the mobile telephone subscriber roams to a region, he can enjoy all the services of the original home region just by making his mobile telephone access to the local network system.

What we claim is:

1. A method for realizing subscriber's roaming service by a route server, employed in a next generation network architecture which realizes cross-domain call route through the route server, comprising the following steps of:

(a) a subscriber equipment accessing to a network, sending a register request, and reporting subscriber identification and authentication information after finding a local register server;

(b) the local register server judging whether the subscriber is a contracted subscriber of home domain or not according to the subscriber identification, if yes, performing step (c), otherwise, performing step (g);

(c) the local register server judging whether the authentication information is right or not, if not, refusing the registration, otherwise, performing the next step;

(d) the local register server notifying a local soft switch control device to perform a register operation;

(e) the local register server judging whether there is roaming register information of the subscriber being existing, if not, registering the subscriber and reporting a location update message to the route server, and ending the registration; otherwise, notifying the register server of roaming region that the subscriber has returned, and reporting the location update message of the subscriber to the route server, then performing the next step;

(f) the register server of roaming region logouting the register information of the roaming subscriber, and reporting the location update message of the roaming subscriber to the route server via the soft switch control device, then ending the registration;

(g) the register server of roaming region finding the local register server through the route server, and judging whether the authentication information is right or not in messages exchange between the register server of roaming region and the register server of home region, if not, refusing and ending the registration, otherwise, obtaining service information of the roaming subscriber, and performing the next step;

(h) the register server of roaming region notifying the soft switch control device to perform register operation, allocate resource for the roaming subscriber, store location information of home region and the service information of the roaming subscriber, and send the register message containing the location information of the roaming region to the local register server;

(i) the local register server notifying the soft switch control device of home region to register the registration, and reporting the location update message of the roaming subscriber to the route server, and notifying the register result to the register server of roaming region;

(j) the register server of roaming region notifying the soft switch control device of roaming region to report the location update message of the roaming subscriber to the route server, and ending the registration; and (k) for roaming subscriber-related services initiated in the roaming region and non-roaming region, the soft switch control device of roaming region performing call connection and service control according to local service and inter-office service respectively.

2. The method of claim 1, wherein in said step (g), the register server of roaming region first finds the register server of original roaming region through the route server, and obtains the location information of home region stored in it, then finds the local register server; at the same time, in said step (h), the register server of roaming region also notifies the register server of original roaming region, the register server of original roaming region logouts the register information of the roaming subscriber, and reports the location update message of the roaming subscriber to the route server.

3. The method of claim 2, which further comprises the steps of: the roaming equipment taking initiative to report to the current register server when it is off-line, or the current soft switch control device detecting whether the roaming equipment is off line; and the register server setting the roaming equipment in off-line state after receiving the off-line notification from the roaming equipment or the soft switch control device.

4. The method of claim 2, wherein in said step (a), the register server allocates an IP address for the roaming equipment after the roaming equipment connecting the register server.

5. The method of claim 2, wherein in said step (a), the roaming equipment locates the register server of home domain through a DHCP server location mechanism of DHCP protocol, or the roaming equipment looks up the register server through a way of presetting address.

6. The method of claim 2, wherein in the step (a), the subscriber identification refers to the telephone number or the uniform resource indicator that can locate the subscriber uniquely; the reported information is carried and reported by the roaming equipment automatically, or is input by the roaming subscriber exchanging with the register server through the roaming equipment.

7. The method of claim 2, wherein in the step (a), said roaming equipment also reports signaling protocol it supports; and in said step (c) and (g), the register server further needs to judge whether it supports signaling form of the roaming equipment or not, if not, it refuses the registration.

8. The method of claim 2, wherein in the step (k), the soft switch control device of roaming region sends charge information of the roaming subscriber to the soft switch control device of home region after finishing the service.

9. The method of claim 1, which further comprises the steps of:
the roaming equipment taking initiative to report to the current register server when it is off-line, or the current soft switch control device detecting whether the roaming equipment is off-line; and
the register server setting the roaming equipment in off-line state after receiving the off-line notification from the roaming equipment or the soft switch control device.

10. The method of claim 1, wherein in said step (a), the register server allocates an IP address for the roaming equipment after the roaming equipment connecting the register server.

11. The method of claim 1, wherein in said step (a), the roaming equipment locates the local register server through a DHCP server location mechanism of DHCP protocol, or the roaming equipment looks up the register server through a way of presetting address.

12. The method of claim 1, wherein in the step (a), the subscriber identification refers to the telephone number or the uniform resource indicator that can locate the subscriber uniquely; the reported information is carried and reported by the roaming equipment automatically, or is input by the roaming subscriber exchanging with the register server through the roaming equipment.

13. The method of claim 1, wherein in the step (a), said roaming equipment also reports signaling protocol it supports; and
in said step (c) and (g), the register server further needs to judge whether it supports signaling form of the roaming equipment or not, if not, it refuses the registration.

14. The method of claim 1, wherein in the step (k), the soft switch control device of roaming region sends charge information of the roaming subscriber to the soft switch control device of home region after finishing the service.

15. A system for realizing the method of claim 1, employed in a next generation network architecture with soft switch as core control equipment, comprising:
two or more soft switch control devices located in different physical positions, for accomplishing call connection and service control;
at least one route server, for connecting the soft switch control devices domain into one network, and realizing functions of subscriber route check-in, report and inquiry;
a roaming equipment, for a roaming subscriber accessing to network; and
a register server, for using coordinately with the soft switch control device, with all the equipments connected together by network; wherein
said roaming equipment is used for accessing to the network and registering with the register server mutually, reporting subscriber identification and authentication information, and performing an ordinary function of receiving and answering call;
said register server comprises:
an address allocation unit, for allocating an IP address for the roaming equipment;
an authentication unit, for authenticating the roaming equipment;
a register communication unit, for sending register message containing location information of roaming region, service information of roaming subscriber and register notification of subscriber to other register server, and receiving the register message, the service information of the roaming subscriber and the register notification of the subscriber from other register server;
a register control unit, for judging whether the roaming equipment accessed is a contracted subscriber of home domain, sending a control instruction to the authentication unit and register communication unit according to preset procedure, and notifying the soft switch control device to perform operations of register, check-in and reporting location update message; and
an information maintenance unit, for maintaining local information of the roaming equipment, and notifying the soft switch control device to logout information of corresponding roaming subscriber after receiving the register notification from other register server;
said soft switch control device comprises:
a register operation unit, for allocating resource for the roaming subscriber according to notification of the register control unit, and as the roaming region storing the service information of the roaming subscriber and the location information of local region;

a check-in operation unit, for checking in the register message information transmitted from the roaming region according to notification of said register control device; and an update report unit, for reporting the location update message to the route server connected.

16. The system of claim 15, wherein the roaming equipment and the register server support DHCP protocol.

17. The system of claim 15, wherein the register server is either a composing part of the soft switch control device, or an independent equipment, or part of functions are accomplished by the independent equipment, and the other part of functions are accomplished by the soft switch control device itself.

18. The system of claim 15, wherein the roaming equipment itself carries the subscriber identification (telephone number or uniform resource indicator), the authentication information and protocol information it supports; said register control unit also judges whether it supports the signaling form of the roaming equipment.

19. The system of claim 15, wherein the soft switch control device further comprises a charge process unit, for sending charge information of the roaming subscriber to the soft switch control device of home region after finishing the service.

20. The system of claim 15, wherein the soft switch control device further comprises an off-line detection unit, for automatically detecting whether the roaming equipment is off-line, and notifying the information maintenance unit to set the roaming equipment in off-line state when the roaming equipment is detected to be off-line.

21. The system of claim 15, wherein the roaming equipment can also take initiative to report the message of oncoming off-line state to the current register server.

* * * * *

UNITED STATES PATENT AND TRADEMARK OFFICE
CERTIFICATE OF CORRECTION

| | |
|---|---|
| PATENT NO. | : 7,616,953 B2 |
| APPLICATION NO. | : 10/585537 |
| DATED | : November 10, 2009 |
| INVENTOR(S) | : Hu et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this

Nineteenth Day of October, 2010

David J. Kappos
*Director of the United States Patent and Trademark Office*